(12) United States Patent
Piontek et al.

(10) Patent No.: US 10,544,894 B2
(45) Date of Patent: Jan. 28, 2020

(54) REPAIR CLAMP ASSEMBLY

(71) Applicant: Total Piping Solutions, Inc., Olean, NY (US)

(72) Inventors: Daryl M. Piontek, Great Valley, NY (US); Raymond C. Minich, Bradford, PA (US)

(73) Assignee: Total Piping Solutions, Inc., Olean, NY (US)

( * ) Notice: Subject to any disclaimer, the term of this patent is extended or adjusted under 35 U.S.C. 154(b) by 0 days.

(21) Appl. No.: 15/948,767

(22) Filed: Apr. 9, 2018

(65) Prior Publication Data

US 2018/0224048 A1    Aug. 9, 2018

Related U.S. Application Data

(62) Division of application No. 14/682,585, filed on Apr. 9, 2015, now Pat. No. 9,970,584.

(51) Int. Cl.
| | |
|---|---|
| *F16L 55/178* | (2006.01) |
| *F16L 21/00* | (2006.01) |
| *F16L 21/06* | (2006.01) |
| *F16L 55/172* | (2006.01) |

(52) U.S. Cl.
CPC ............ *F16L 55/178* (2013.01); *F16L 21/00* (2013.01); *F16L 21/005* (2013.01); *F16L 21/065* (2013.01); *F16L 55/172* (2013.01)

(58) Field of Classification Search
CPC ....... F16L 55/178; F16L 55/172; F16L 21/00; F16L 21/005; F16L 21/065
USPC .......................................... 138/158, 161, 99
See application file for complete search history.

(56) References Cited

U.S. PATENT DOCUMENTS

| | | |
|---|---|---|
| 3,089,212 A | 5/1963 | Graham et al. |
| 3,151,632 A | 10/1964 | Risley et al. |
| 3,173,450 A * | 3/1965 | Halterman ............ F16L 55/172 138/97 |

(Continued)

FOREIGN PATENT DOCUMENTS

EP      0 351 019 A1    1/1990

OTHER PUBLICATIONS

International Search Report and Written Opinion of the International Searching Authority dated Jun. 8, 2016 (18 pages).

*Primary Examiner* — Craig M Schneider
*Assistant Examiner* — David R Deal
(74) *Attorney, Agent, or Firm* — Harter Secrest & Emery LLP (57) ABSTRACT

A clamp comprising a band, the band comprising first and second edges, first and second lug elements connected proximate to the first and second band edges, multiple bolts extending transversely between the first and second lug elements, the first lug element comprising a transversely extending lug finger having a finger bearing surface, the second lug element comprising a lug finger land having a bearing surface, the lug finger extending transversely between the first and second lug elements, the finger bearing surfaces of the lug finger and the lug finger land contoured relative to each other such that tightening the band to reduce a gap between the edges of the band in a first range causes the first lug element to rotate in a first direction of rotation and in a second range causes the first lug element to rotate in a second direction opposite to the first direction of rotation.

4 Claims, 12 Drawing Sheets

(56) References Cited

U.S. PATENT DOCUMENTS

| | | | | |
|---|---|---|---|---|
| 3,189,970 | A | * | 6/1965 | Barr ................. F16L 55/172 138/99 |
| 3,204,665 | A | | 9/1965 | Faint |
| 3,267,547 | A | * | 8/1966 | Morriss, Jr. .......... F16L 55/172 24/279 |
| 3,470,916 | A | * | 10/1969 | Halterman ........... F16L 55/172 138/99 |
| 3,472,537 | A | * | 10/1969 | Paterson ............... F16L 41/06 138/99 |
| 3,680,180 | A | * | 8/1972 | Gould ................ F16L 55/172 138/99 |
| 3,692,062 | A | | 9/1972 | Dunmire |
| 3,848,638 | A | * | 11/1974 | Huslander ............ F16L 55/172 138/99 |
| 3,914,833 | A | * | 10/1975 | Dunmire .............. F16L 55/172 138/99 |
| 4,172,472 | A | | 10/1979 | Parrish |
| 4,413,388 | A | | 11/1983 | Akhtar-Khavari et al. |
| 4,463,975 | A | * | 8/1984 | McCord ............... F16L 21/002 285/419 |
| 5,219,001 | A | * | 6/1993 | Rennaker ............. F16L 55/172 138/97 |
| 6,588,070 | B2 | * | 7/2003 | Tran ................. F16L 55/172 24/279 |
| 6,830,268 | B2 | | 12/2004 | Krausz et al. |
| 2012/0192963 | A1 | | 8/2012 | Minich |

\* cited by examiner

REPAIR CLAMP ASSEMBLY

RELATED APPLICATIONS

This application is a divisional of U.S. patent application Ser. No. 14/682,585, filed on Apr. 9, 2015, which is incorporated herein by reference in its entirety.

TECHNICAL FIELD

The present invention relates generally to the field of repair clamps, and more particularly to an improved extended range clamp.

BACKGROUND ART

Repair clamps are used in the placement of pipes or for connecting the ends of pipes axially. Such clamps generally have a cylindrical body or band which encircles the subject pipe or pipe ends. Two opposed lugs are attached to the opposed edges of the cylindrically-shaped band, and the lugs are drawn towards each other by tightening bolts or fasteners. This reduces the affective internal diameter of the band, which in turn compresses an elastomeric sheet gasket that is typically placed between the band and the subject pipe. Compressing the gasket sheet seals the gasket to the pipe. To bridge the gap that is formed between the ends of the band, a spanner or bridge plate molded into or placed onto the outer surface of the gasket is employed to provide gasket compression across the gap. The spanner plate fits on the outer surface of the elastomeric sheet gasket and is compressed radially inward by the lugs along the opposed edges of the cylindrical band. The lug pairs have projecting fingers with corresponding matching opposing finger contact lands that place the finger to land contact surfaces parallel to the finger motion direction and parallel to the axis of the tightening bolts of the system.

The range of diameters of piping for which a repair clamp may be used is typically fairly limited. For example, at present pipeline repair clamps have a range of about 0.3 to 0.4 inches for the diameter span of pipes that the repair clamp can effectively seal. The linear closure travel necessary for this range is only in the order of 1.20-1.25 inches.

BRIEF SUMMARY OF THE INVENTION

With parenthetical reference to corresponding parts, portions or surfaces of the disclosed embodiment, merely for the purposes of illustration and not by way of limitation, an improved clamp assembly (15) is provided comprising a band (16) configured to clamp to a fluid conduit (17) orientated about a longitudinally extending axis (x-x); the band comprising a first longitudinally extending edge (19) and a second longitudinally extending edge (20); a connecting assembly (21) configured and arranged to tightened the band to the fluid conduit from a non-actuated position (FIG. 8) to a tightened position (FIG. 12); the connecting assembly comprising a first lug element (22) connected proximate to the first longitudinally extending edge of the band and a second lug element (23) connected proximate to the second longitudinally extending edge of the band; the first lug element comprising multiple longitudinally spaced bolt receiving openings (24a, 24b) and the second lug element comprising multiple longitudinally spaced bolt receiving openings (25a, 25b); multiple bolts (26a, 26b) extending transversely between the first lug element and the second lug element, each of the bolts orientated about a central bolt axis (28a, 28b) and extending from one of the bolt receiving openings in the first lug element to one of the bolt receiving openings in the second lug element; the first lug element comprising a transversely extending lug finger (29a) having a finger bearing surface (30a, 30b, 30c, 30d); the second lug element comprising a lug finger land (31) having a bearing surface (32a, 32b, 32c); the lug finger extending transversely between the first lug element and the second lug element such that the finger bearing surface of the lug finger bears against the bearing surface of the lug finger land; the finger bearing surface of the lug finger and the bearing surface of the lug finger land contoured relative to each other such that tightening the band to reduce a gap (33a) between the first longitudinally extending edge and the second longitudinally extending edge of the band in a first range (34) causes the first lug element to rotate in a first direction of rotation (35) generally about the first longitudinally extending edge of the band; and the finger bearing surface of the lug finger and the bearing surface of the lug finger land contoured relative to each other such that tightening the band to reduce the gap between the first longitudinally extending edge and the second longitudinally extending edge of the band in a second range (36) causes the first lug element to rotate in a second direction (37) generally about the first longitudinally extending edge of the band that is opposite to the first direction of rotation; whereby the first longitudinally extending edge of the band and the second longitudinally extending edge of the band may be drawn towards each other to tighten the band to the fluid conduit.

The assembly may further comprise a member (38) configured to span the gap between the first longitudinally extending edge and the second longitudinally extending edge of the band and a gasket (18) disposed between the band and the fluid conduit.

The first lug element may comprise multiple longitudinally spaced and transversely extending lug fingers (29a, 29b), each of the fingers having a finger bearing surface; the second lug element may comprise multiple longitudinally spaced lug finger lands (31a, 31b), each of the lug finger lands having a bearing surface; each of the lug fingers of the first lug element may extend transversely between the first lug element such that each of the finger bearing surfaces of the lug fingers bear against one of the bearing surfaces of the lug finger lands; each of the finger bearing surfaces of the lug fingers and the bearing surfaces of the lug finger lands may be contoured relative to each other such that tightening the band to reduce the gap between the first longitudinally extending edge and the second longitudinally extending edge of the band in a first gap range causes the first lug element to rotate in a first direction of rotation generally about the first longitudinally extending edge of the band; and the finger bearing surfaces of the lug fingers and the bearing surfaces of the lug finger lands contoured relative to each other such that tightening the band to reduce the gap between the first longitudinally extending edge and the second longitudinally extending edge of the band in a second gap range narrower than the first gap range causes the first lug element to rotate in a second direction of rotation generally about the first longitudinally extending edge of the band that is opposite to the first direction of rotation.

The second lug element may comprise multiple longitudinally spaced and transversely extending lug fingers (39a, 39b), each of the fingers having a finger bearing surface (40a-40b); the first lug element may comprise multiple longitudinally spaced lug finger lands (41a, 41b), each of the lug finger lands having a bearing surface (42a, 42b); each of the lug fingers of the second lug element may extend transversely between the second lug element and the first lug element such that each of the finger bearing surfaces of the lug fingers of the second lug element bear against one of the bearing surfaces of the lug finger lands of the first lug element. The finger bearing surfaces of the lug fingers of the second lug element and the bearing surfaces of the lug finger lands of the first lug element may be contoured relative to each other such that tightening the band to reduce the gap between the first longitudinally extending edge and the second longitudinally extending edge of the band in a first gap range causes the second lug element to rotate in a first direction of rotation generally about the second longitudinally extending edge of the band; and the finger bearing surfaces of the lug fingers of the second lug element and the bearing surfaces of the lug finger lands of the first lug element may be contoured relative to each other such that tightening the band to reduce the gap between the first longitudinally extending edge and the second longitudinally extending edge of the band in a second gap range narrower than the first gap range causes the second lug element to rotate in a second direction of rotation generally about the second longitudinally extending edge of the band that is opposite to the first direction of rotation.

The finger bearing surface may comprise a first transversely extending surface (30a), a second transversely extending surface (30c), and a third sloped surface (30b) orientated transversely between the first surface and the second surface and sloped at an angle (50b) from the central bolt axis. The finger bearing surface may comprise an inner transversely extending surface (30a) and an outer transversely extending surface (30d) sloped at an angle (50d) from the central bolt axis. The lug finger land bearing surface may comprise a first transversely extending surface (32a) sloped at an angle (Ma) from the central bolt axis. The lug finger land bearing surface may comprise a second transversely extending surface (32b) sloped at an angle (Mb) from the central bolt axis that is less than the angle (Ma) of the sloped first transversely extending surface (32a). The lug finger land bearing surface may comprise a third transversely extending surface (32c).

The first direction of rotation of said first lug element may be away from said longitudinally extending axis of said conduit and said second direction of rotation of said first lug element may be towards said longitudinally extending axis of said conduit.

The first lug element may be connect to the band proximate to the first longitudinally extending edge of the band via weld connection or a mechanical connection and the second lug element may be connected to the band proximate to the second longitudinally extending edge of the band via a weld connection or a mechanical connection. The bolt receiving openings in the first lug element may comprise an open slot and the bolt receiving openings in the second lug element may comprise a cylindrical through-bore. The lug finger of the first lug element may be generally L-shaped and comprise an extension portion (62a) and a spanning finger portion. The first longitudinally extending edge of the band may comprise a longitudinally extending P-shaped end portion and the first lug element may comprise a longitudinally extending P-shaped slot configured and arranged to receive the P-shaped end portion of the band.

The clamp may be configured as a tapping sleeve or a multi-paneled repair clamp, wherein the band comprises a first shell member having the first longitudinally extending edge and a second shell member having the second longitudinally extending edge, the second shell member separate from the first shell member, and wherein the first shell member has a third longitudinally extending edge and the second shell member has the fourth longitudinally extending edge, and wherein the connecting assembly further comprises a third lug element connected proximate to the third longitudinally extending edge of the band and a fourth lug element connected proximate to the fourth longitudinally extending edge of the band, whereby the third longitudinally extending edge and the fourth longitudinally extending edge may be drawn towards each other to tighten the band to the fluid conduit.

In another aspect, a clamp assembly is provided comprising a band (16) configured to clamp onto a fluid conduit (17) orientated about a longitudinally extending axis (x-x); the band comprising a first longitudinally extending edge (20) and a second longitudinally extending edge (19); a connecting assembly (21) configured and arranged to tighten the band to the fluid conduit from a non-actuated position to a tightened position; the connecting assembly comprising a first lug element (23) connected proximate to the first longitudinally extending edge of the band and a second lug element (22) connected proximate to the second longitudinally extending edge of the band; the first lug element comprising multiple longitudinally spaced bolt receiving openings and the second lug element comprising multiple longitudinally spaced bolt receiving openings; multiple bolts extending transversely between the first lug element and the second lug element, each of the bolts extending from one of the bolt receiving openings in the first element to one of the bolt receiving openings in the second lug element; the first lug element comprising multiple longitudinally spaced and transversely extending lug fingers (39a, 39b); the second lug element comprising multiple longitudinally spaced lug finger lands (41a, 41b); each of the lug fingers of the first lug element extending transversely between the first lug element and the second lug element; and a handle (43) extending longitudinally between at least two of the transversely extending lug fingers (39a, 39b). The first lug element may further comprise a longitudinally extending thumb grip edge (44).

In another aspect, a clamp assembly is provided comprising a band configured to clamp onto a fluid conduit orientated about a longitudinally extending axis; the band comprising a first longitudinally extending edge and a second longitudinally extending edge; a connecting assembly configured and arranged to tighten the band to the fluid conduit from a non-actuated position to a tightened position; the connecting assembly comprising a first lug element connected proximate to the first longitudinally extending edge of the band and a second lug element connected proximate to the second longitudinally extending edge of the band; the first lug element comprising multiple longitudinally spaced bolt receiving openings and the second lug element comprising multiple longitudinally spaced bolt receiving openings; multiple bolts extending transversely between the first lug element and the second lug element, each of the bolts extending from one of the bolt receiving openings in the first element to one of the bolt receiving openings in the second lug element; the first lug element comprising multiple longitudinally spaced and transversely extending lug fingers; the second lug element comprising multiple longitudinally spaced lug finger lands; each of the lug fingers of the first lug element extending transversely between the first lug element and the second lug element; and at least one of the transversely extending lug fingers having, at a transverse position between the first lug element and the second lug element, a generally I-beam-shaped longitudinal cross-sectional profile (45a). Each of the transversely extending lug fingers may have, at a transverse position between the first lug element and the second lug element, a generally I-beam-shaped longitudinal cross-sectional profile (45a, 45b).

DETAILED DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
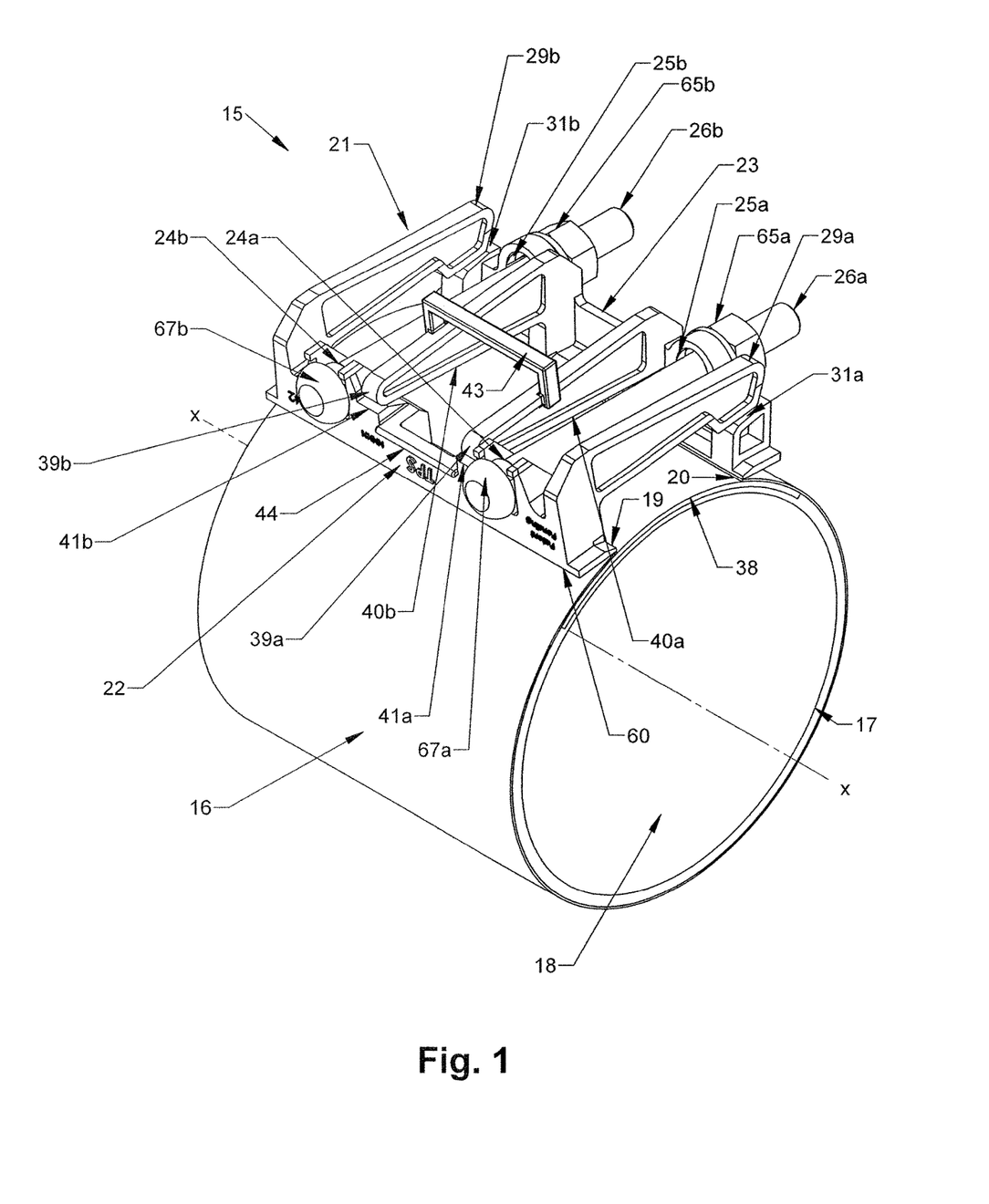
FIG. 1 is a top isometric view of an embodiment of the improved repair clamp assembly.
Figure 2:
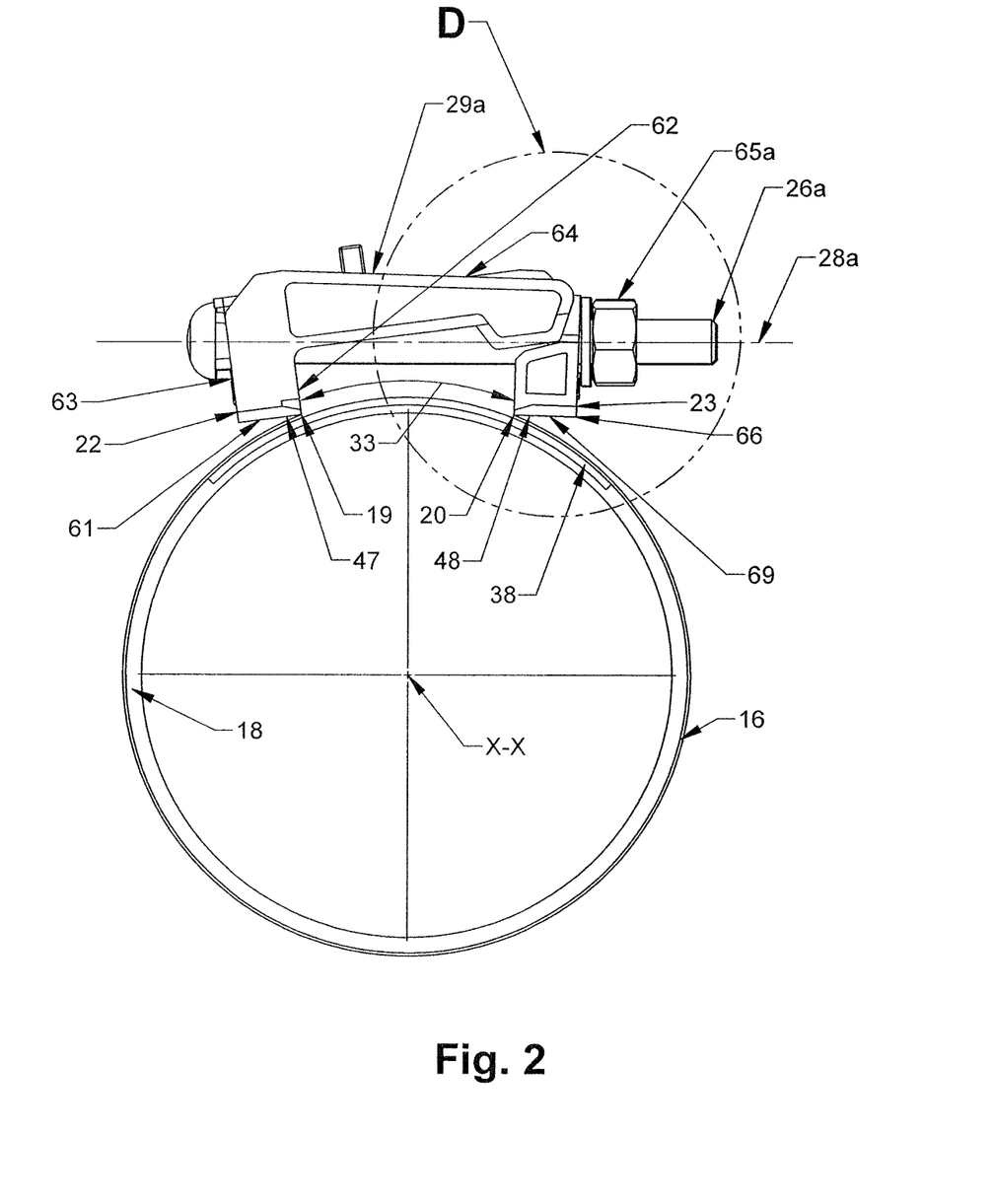
FIG. 2 is a right side view of the repair clamp assembly shown in FIG. 1.
Figure 3:
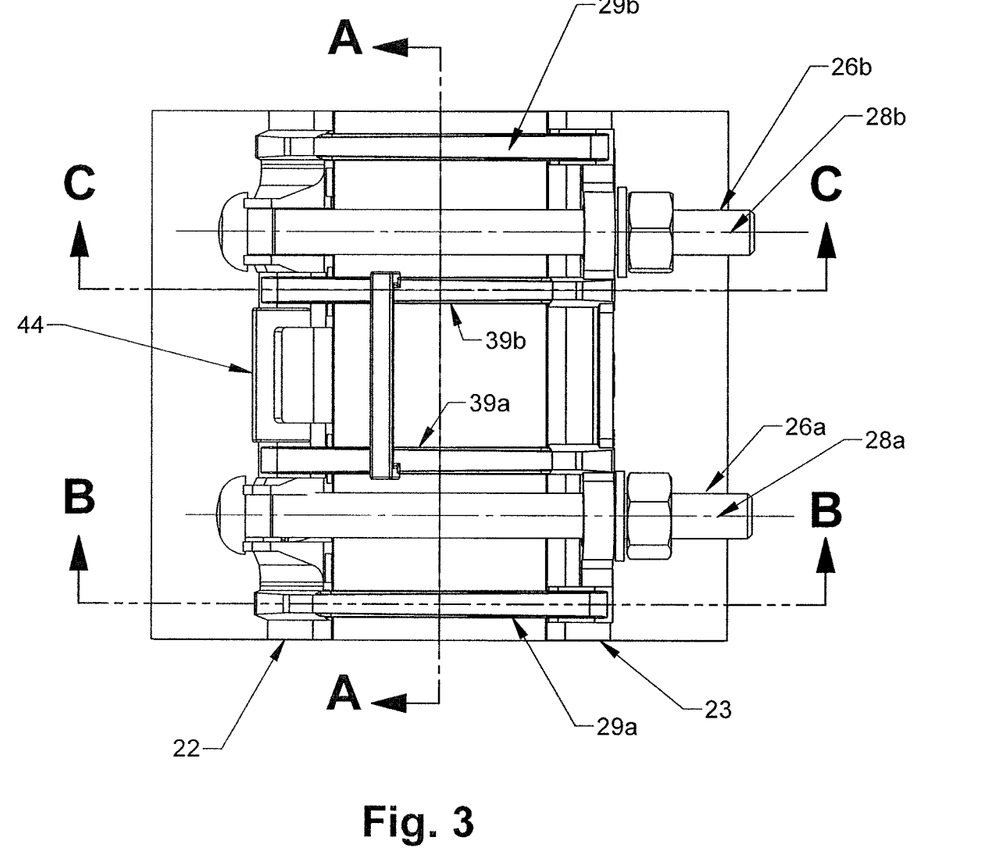
FIG. 3 is a top plan view of the repair clamp assembly shown in FIG. 1.

Referring now to the drawings, and more particularly to FIG. 1 thereof, an improved repair clamp and gasket assembly is provided, of which a first embodiment is generally indicated at 15. As shown in FIGS. 1-3, assembly 15 generally comprises band 16, which has two longitudinally extending opposed edges 19 and 20 and in operation is circumferentially disposed on the outside of pipe or fluid conduit 17, spanner 38, which in operation extends circumferentially across the gap between edges 19 and 20 of band 16, gasket 18, which in operation is disposed between pipe 17 and both band 19 and spanner 38, and connecting assembly 21, which in operation spans the gap between edges 19 and 20 of band 16 and is used to draw edges 19 and 20 together. Connecting assembly 21 is attached to band 16 at connections 47 and 48 near or proximate to longitudinally extending edges 19 and 20 of band 16, respectively.

As shown, band 16 is a thin semi-cylindrical metal member configured and arranged to be tightened around pipe 17 with connection assembly 21. Band 16 has two longitudinally extending opposed edges 19 and 20.

Gasket 18 is a flexible elastomeric matte gasket sheet having specially contoured sealing features and which is disposed between the inner surfaces of band 16 and spanner 38 and the outer cylindrical surface of pipe 17. Thus, gasket 18 is sandwiched between the inside semi-cylindrical surfaces of band 16 and spanner 38 and the outside cylindrical surface of conduit 17 to provide sufficient sealing force to prevent leakage of fluid. Elastic or sealing energy is imparted into assembly 15 by tightening connecting assembly 21 from a loosened or a non-actuated position to a tightened sealed position.

As shown, spanner 38 is a metallic strip that spans arc-shaped gap 33 between opposed longitudinally extending edges 19 and 20 of band 16. The interior edges and surfaces of band 16 that are in contact with spanner 38 apply a normal force or pressure that is directed radially inward toward the center axis of pipe 17, which develops the necessary sealing pressure between spanner 38 and pipe 17. Spanner 38 is designed to compress gasket 18 across gap 33 between longitudinally extending edges 19 and 20 of band 16. In one embodiment, the right side of spanner plate 38 is mechanically attached to lug 23. As an alternative, without limitation, spanner 38 may be attached to gasket 18 and gasket 18 in turn at least partially attached to band 16. In these embodiments, the right side of spanner 38 is thereby stationary relative to lug 23 and edge 20 of band 16. The result is that lug 23 acts as a non-moving or anchored lug and spanner 38 is thereby restricted such that it does not slide or skate relative to lug 23. Opposing lug 22 and edge 19 of band 16 is intended to slide translate or slip over the outer surface of spanner 38, and thereby provide band diameter reduction and gasket compression upon the tightening of assembly 21. As bolts 26a and 26b of connecting assembly 21 are tightened, a radially orientated inward force is applied to spanner 38.

As shown in FIGS. 1-6, a specially configured lug 22 is welded at connection 47 to band 16 proximate to longitudinally extending edge 19, which is coincident with longitudinal axis x-x of pipe 17. Similarly, a specially configured lug 23 is welded at connection 48 to band 16 proximate to longitudinally extending edge 20, which is coincident with longitudinal axis x-x of pipe 17.

Lug element 22 generally comprises lug base element 60 welded to edge 19 of band 16 at connection 47. Base attachment portion 60 includes bottom surface 61 extending from connection 47, left surface 63, right surface 62, and a plurality of longitudinally spaced bolt receiving slots or grooves 24a and 24b in the top of base 60 extending from the left side to the right side thereof. Fingers 29a and 29b are spaced longitudinally along base 60 of lug 22 and extend transversely towards lug 23 therefrom. Cam tipped moment reaction fingers 29a and 29b provide a longer moment arm to allow for a greater maximum diameter range or extended range for assembly 15 to actuate and seal. Lands 41a and 41b are spaced longitudinally along base 60 of lug 22.

Lug element 23 generally comprises lug base element 66 welded to edge 20 of band 16 at connection 48. Base attachment portion 66 includes bottom surface 69 extending from connection 47, left surface 73, right surface 74, and a plurality of longitudinally spaced bolt hole openings 25a and 25b extending from the left side to the right side thereof. Fingers 39a and 39b are spaced longitudinally along base 66 of lug 23 and extend transversely toward lug 22 therefrom. Moment reaction fingers 39a and 39b provide a longer moment arm to allow for a greater maximum diameter range or extended range for assembly 15 to actuate and seal. Lands 31a and 31b are spaced longitudinally along base 66 of lug 23.

Base 60 of lug 22 and base 66 of lug 23 provide the necessary clearance outside of band 16 and conduit 17 for bolts 26a and 26b. Bolt heads 67a and 67b abut against the left side of slots 24a and 24b and extend between lugs 22 and 23. Corresponding washers and nuts 65a and 65b are tightened on the threaded end portions of bolts 26a and 26b that extend through to the right side of openings 25a and 25b in lug 23, respectively, to draw opposed lug elements 22 and 23 together, thereby tightening band 16 to pipe 17.

In this embodiment, lugs 22 and 23 are forged, extruded or molded and formed of a solid unitary piece. However, it is contemplated that lugs 22 and 23 may be cast as separate pieces and then formed together to provide an assembled part. In this embodiment, lug elements 22 and 23 are welded at connections 47 and 48 to edges 19 and 20 of band 16, respectively. Alternatively, lugs 22 and 23 may be mechanically connected to band edges 19 and 20. For example, and without limitation, band edges 19 and 20 may each have a longitudinally extending P-shaped end portion and base portions 60 and 66 of lugs 22 and 23 may include a longitudinally P-shaped slot configured and arranged to receive the P-shaped end portions of band 16. The P-shaped end portion of the band edges may thereby be slid into the P-shaped slot in the base of the respective lugs to provide a mechanical connection such that the edges of band 16 move transversely with tightening of connecting assembly 21 and lugs 22 and 23. Other mechanical connections may be used.

Figure 5:
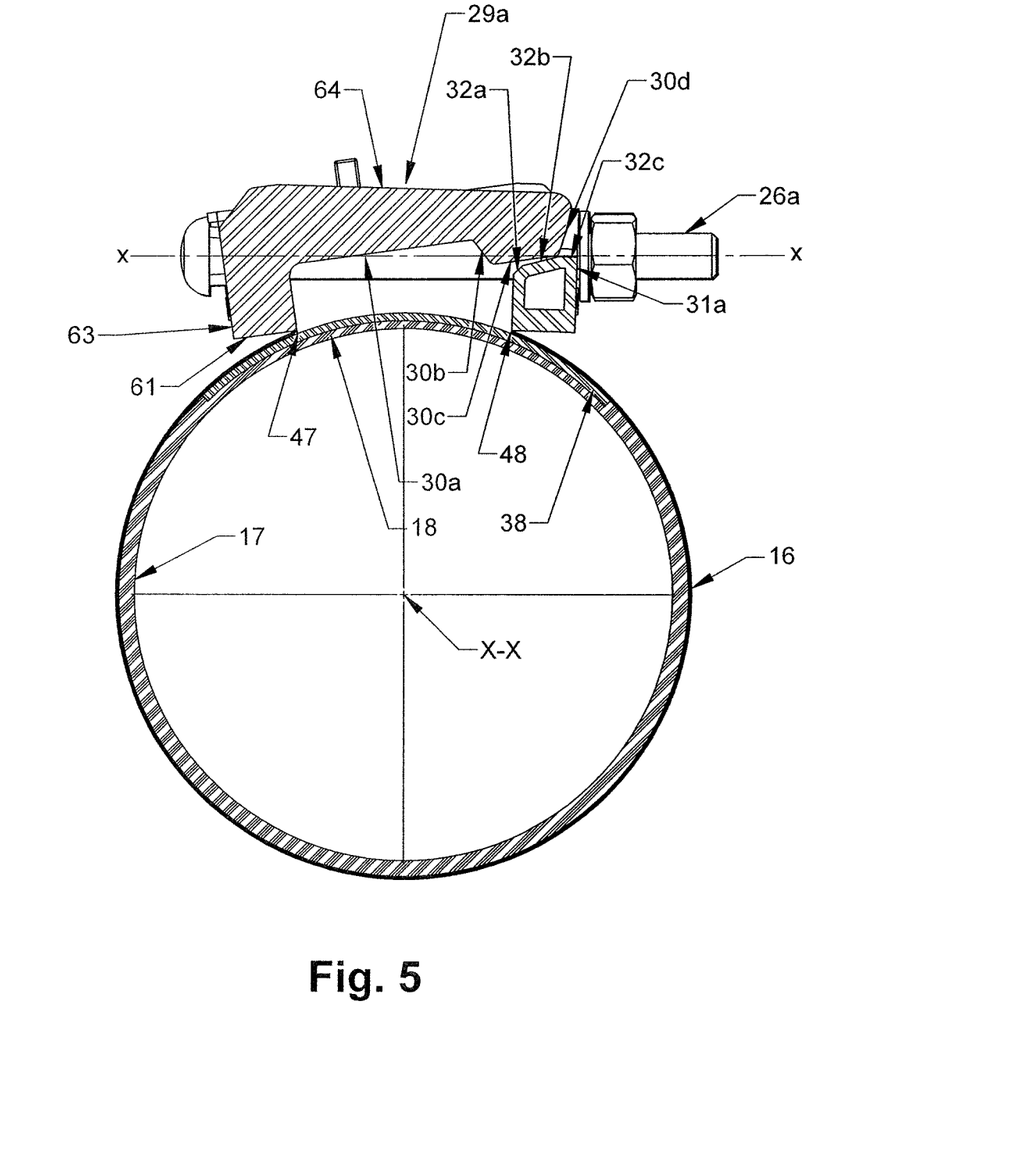
FIG. 5 is a transverse vertical cross-sectional view of the repair clamp assembly shown in FIG. 3, taken generally on line B-B of FIG. 3.
Figure 7:
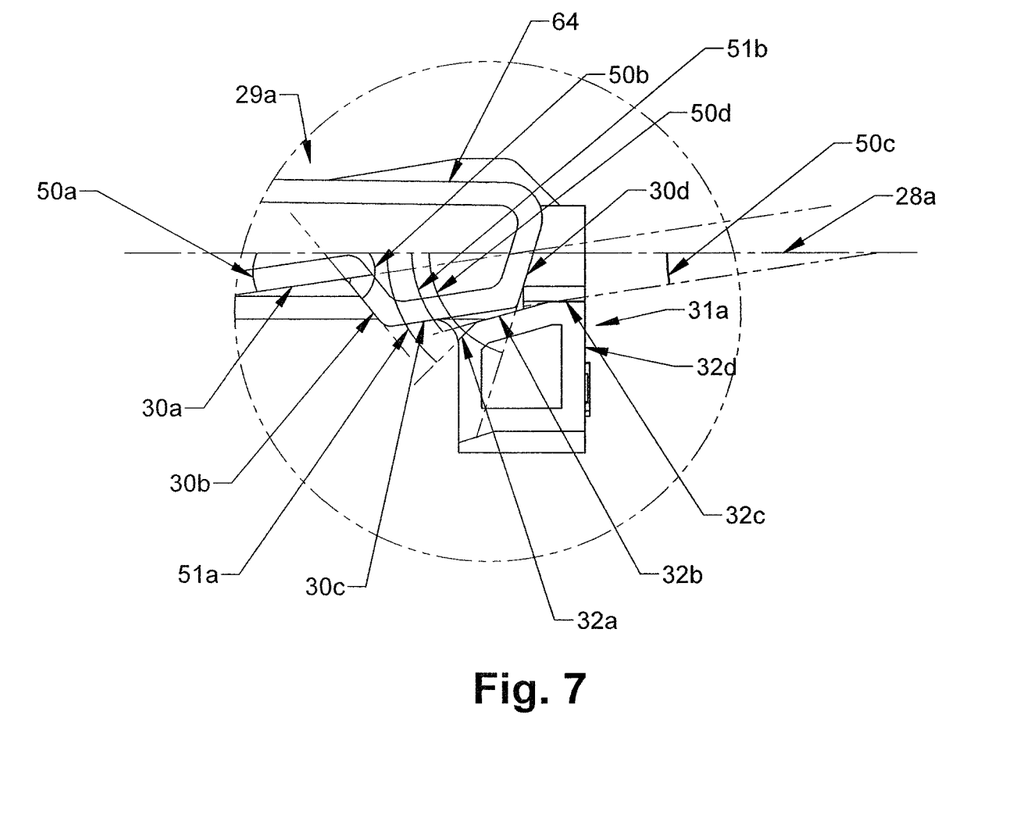
FIG. 7 is an enlarged detailed view of the distal end of the finger shown in FIG. 2, taken generally within the indicated circle D of FIG. 2.

As shown in FIGS. 5 and 7, each of fingers 29a and 29b of lug 22 and each of lands 31a and 31b of lug 23 are specially configured with tapered or sloped bearing surfaces that provide relative moment forces about band edge 19 and connection 47. As shown, each of lug finger 29a and 29b are generally bounded by surface 30a, which extends transversely at a generally right angle from base 60, negatively sloped or tapered surface 30b, positively sloped or tapered surface 30c, further positively sloped or tapered surface 30d and upper surface 64, which extends transversely back to base 60. As described below, in this embodiment surfaces 30a, 30b, 30c and at least a portion of surface 30d act as bearing surfaces.

As shown in FIG. 7, surface 30a is sloped from base 60 up towards bolt axis 28 and top surface 64 at angle 50a. In this embodiment, angle 50a is about 9 degrees. Surface 30b is in turn sloped in the opposite direction away from surface 30a at an angle from bolt axis 28 and top surface 64 of 50b. In this embodiment, angle 50b is about 51 degrees. Surface 30c is in turn sloped opposite to surface 30b and in the same direction as surface 30a at an angle from bolt axis 28 and top surface 64 of 50c. In this embodiment, angle 50c is about 9 degrees. Surface 30d is tapered up at a greater angle than surface 30c. Surface 30d is sloped up towards bolt axis 28 and top surface 64 at angle 50d. In this embodiment, angle 50d is about 73 degrees. Surfaces 30a, 30b, 30c and 30d form a cam-shaped bearing surface on the underside of lug fingers 29a and 29b. Thus, the end profile of finger 29a includes a rise section 30d at or near the outermost distal end of finger 29, a dwell section 30c, and then a lower fall section 30b. This profile projects outwardly and radially inward from underside the finger.

Lands 31a and 31b on opposed lug 23 each also include tapered or sloped bearing surfaces. In particular, lands 31a and 31b include a more steeply sloped surface 32a extending up from left side surface 73 towards bolt axis 28 at angle 51a. In this embodiment, angle 51a is about 45 degrees. Surface 32b is not as steep as surface 32a and is angled from surface 32a up towards bolt axis 28 and top surface 64 of finger 19 at angle 51b. In this embodiment, angle 51b is about 16 degrees. Top surface 32c of lands 31a and 31b is generally almost parallel to bolt axis 28 and top surface 64 of finger 19. Generally right side surface 32d of land 31a intersects top surface 32c and is generally orientated perpendicular to top surface 32c and to bolt axis 28 and top surface 64 of finger 19.

Bearing surfaces 30a-30d of finger 19, upon assembly around conduit 17 and tightening of connecting assembly 21, contact and slide over the opposing bearing surfaces 32a, 32b and 32c of opposing land 31a sequentially as gap 33 between band edge 19 and band edge 20 is closed or reduced by the tightening of connecting assembly 21. The profiles of these bearing surfaces provide a cam-like timed function and controlled mechanism to rotate lug fingers 29a and 29b away from and then back towards center axis x-x of band 16 and conduit 17, as a function of the diameter of conduit pipe 17 and the gap distance 33 between edges 19 and 20 of band 16, to thereby provide a reduction in the friction between lug 22 and spanner 38 at the extended pipe diameter range, by modifying the travel or motion profile of either or both lugs 22 and 23 relative to each other and relative to spanner 38. The specially configured bearing profile of fingers 29a and 29b, relative to the bearing profile of lands 31a and 31b, extends the useful diameter application range of clamp 15 beyond a standard or customary pipe repair clamp. Without this specially configured profile, at the larger diameters of a conduit, the arc of spanner 38 obstructs and interferes with the closure travel of lugs 22 and 23, by obstructing the leading edge 19 of the sliding lug 22 and thereby increasing friction between lug 22 and spanner 38. The specially configured profiles of fingers 29a and 29b and corresponding lands 31a and 31b provide the displacement necessary to overcome this obstruction, interference or friction at the extended or high range of assembly 15. The profile of fingers 29a and 29b and lands 31a and 31b changes the lug 22 approach angle to spanner 38 to a more tangent condition. Then, once assembly 15 has been squeezed or tightened into a more standard or normal range, fingers 29a and 29b are allowed to return to a standard approach condition. The specially configured relative bearing surfaces cause sliding lug 22 to rotate in such a manner as to reduce the incident contact angle at leading edge 19 of unanchored lug 22. Reducing the incident contact angle of attack reduces the contact friction between lug 22 and spanner 38 at contact point 19, allowing spanner 38 to more freely slide under lug 22 and band edge 19. This also reduces the likelihood of spanner 38 buckling and a corresponding loss of gasket pressure under spanner 38 that may occur due to spanner buckling.

Figure 8:
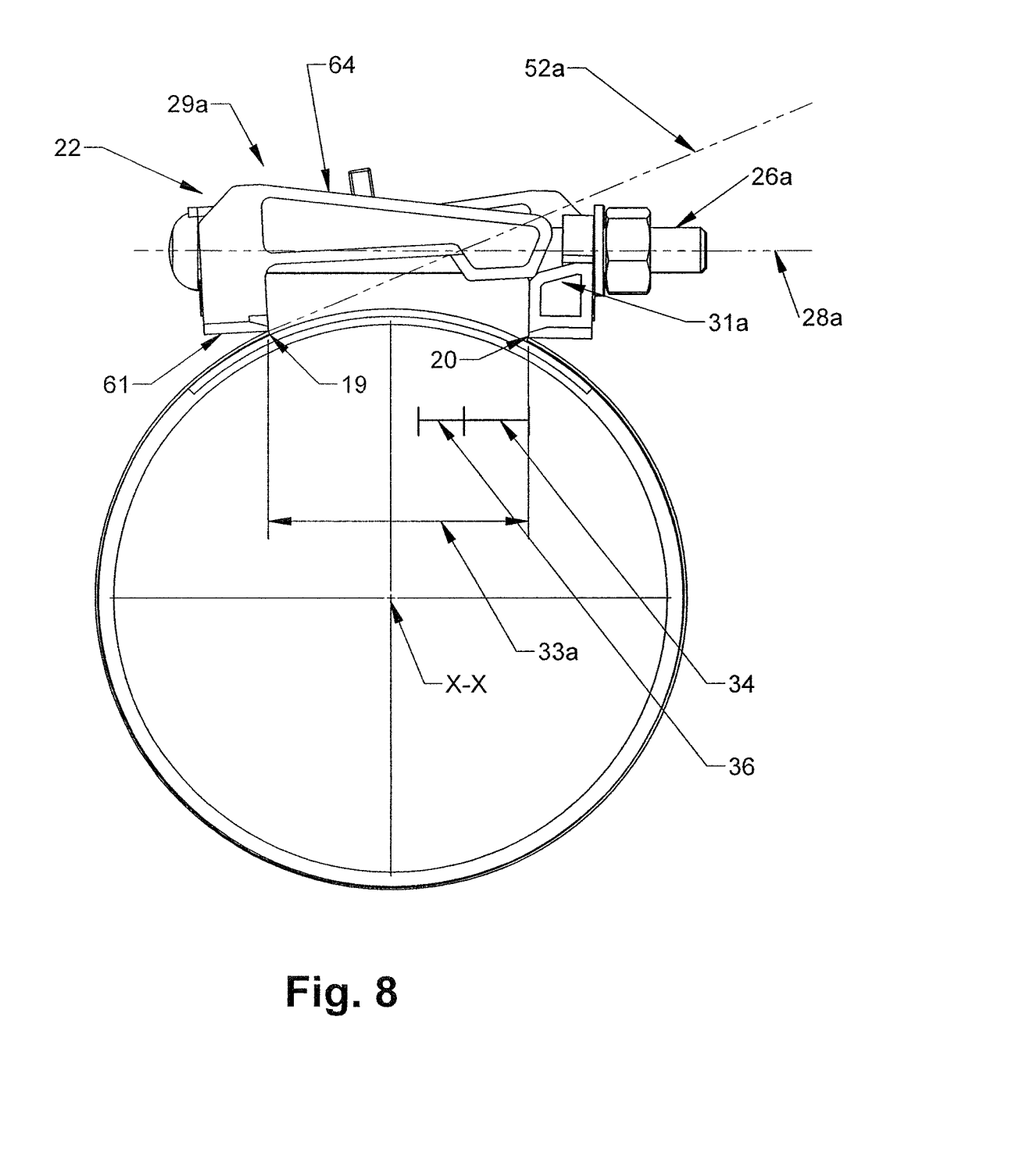
FIG. 8 is a right side view of the repair clamp assembly shown in FIG. 1, with a first gap distance.

Accordingly, the specially configured bearing geometry of fingers 29a and 29b and lands 31a and 31b rotate fingers 29a and 29b and thereby connection 47 between lug 22 and band 16 at edge 19 into a position more amenable to sliding over spanner 38. In particular, as shown in FIGS. 8-12, lug 22 is rotated about connection 47 as a function of the gap distance between edges 19 and 20 of band 16 as connection assembly 21 is tightened. FIG. 8 shows assembly 15 in a position in which the corner of finger surfaces 30c and 30d is in contact and bearing against surface 32a of land 31a. As shown, in this embodiment the gap 33a between band edges 19 and 20 is large or extended and the tightening process is just beginning. As shown, at gap 33a, lug finger 29 and lug 22 are at rotational position 52a, where the rotational position is defined by a line through junction 47 and the junction of surfaces 30a and 30b.

Figure 9:
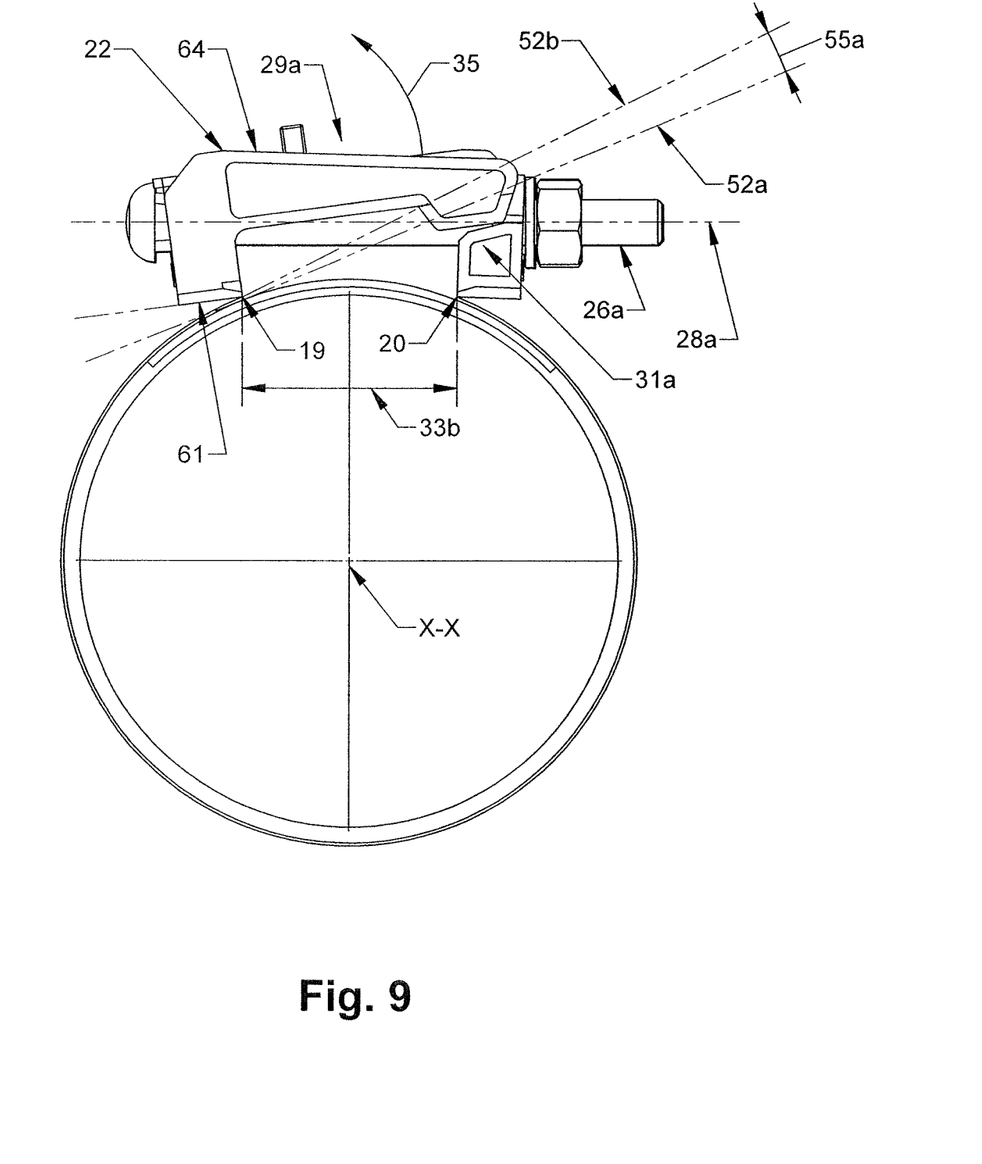
FIG. 9 is a right side view of the repair clamp assembly shown in FIG. 1, with a reduced gap distance as compared to FIG. 8.

FIG. 9 shows assembly 15 after it has been tightened to reduce the gap 33a between edges 19 and 20. As shown, gap 33a has been reduced to gap 33b. The corner of finger surfaces 30c and 30d has moved to the right up surface 32b to a point just before it levels off to surface 32c. In this embodiment, as a result of the specially contoured opposing profiles of the bearing surfaces of fingers 29a and 29b and lands 31a and 31b, respectively, this movement of lug 22 towards lug 23 results in lug 22 rotating generally about band edge 19 and connection 47 in counterclockwise direction 35 and towards centerline x-x. As shown, lug 23 has rotated in direction 35 from its original rotational position 52a at gap 33a shown in FIG. 8 to new rotational position 52b at gap 33b shown in FIG. 9. In this embodiment, angular rotation 55a of lug 22 is about 4 degrees. This rotation is also reflected in the rotation of bottom surface 61 of base 60 of lug 22 about contact edge 19.

Figure 10:
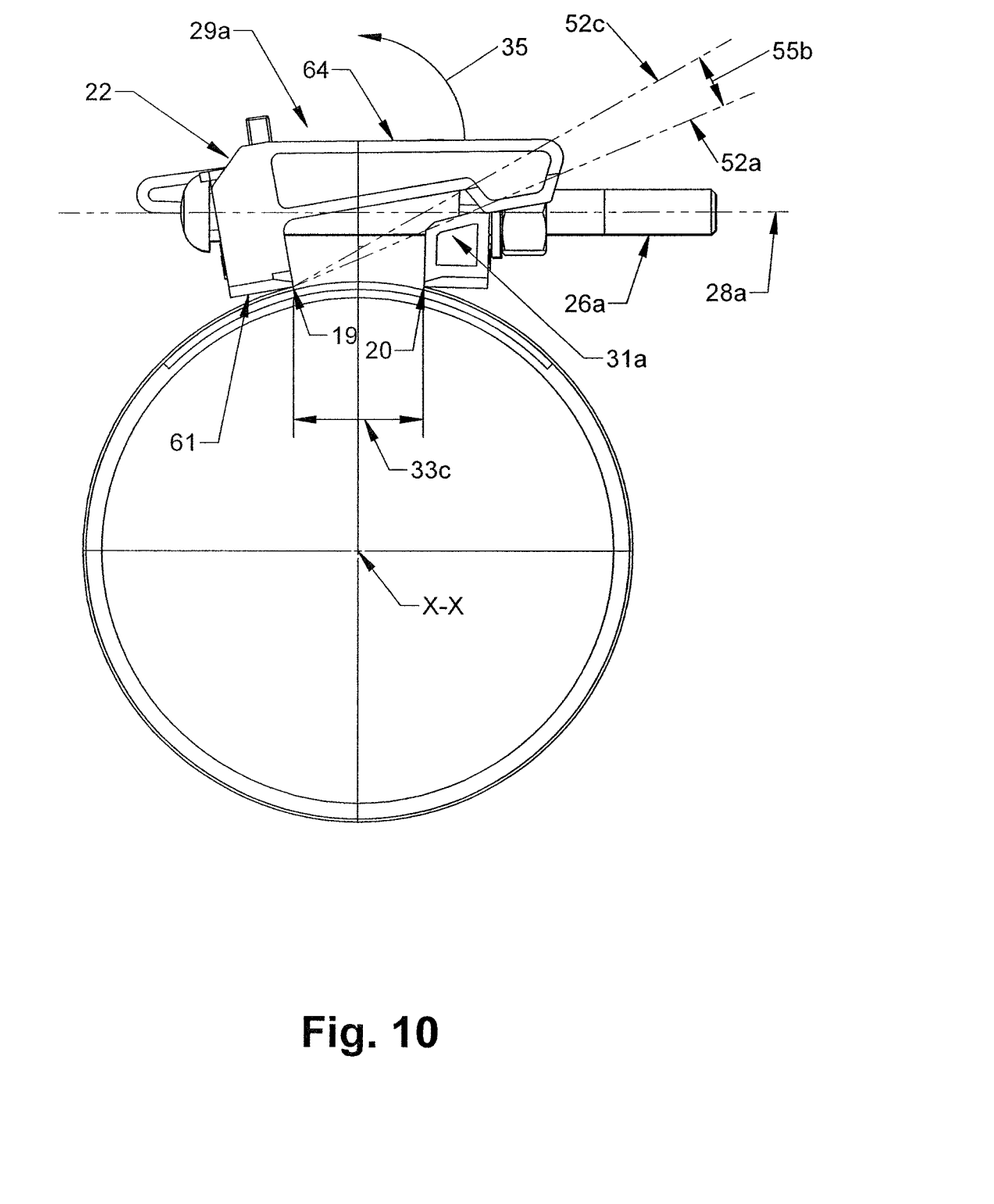
FIG. 10 is a right side view of the repair clamp assembly shown in FIG. 1, with a reduced gap distance as compared to FIG. 9.

FIG. 10 shows assembly 15 after it has been tightened to reduce the gap 33b between edges 19 and 20. As shown, gap 33b has been reduced to gap 33c. The corner of finger surfaces 30b and 30c has moved to the right up surface 32b and along surface 32c to a point just before it falls off of surface 32c. In this embodiment, this movement of lug 22 towards lug 23 results in lug 22 rotating generally about band edge 19 and connection 47 in counterclockwise direction 35 and away from centerline x-x. As shown, lug 23 has rotated in direction 35 from its original rotational position 52a at gap 33a shown in FIG. 8 to new rotational position 52c at gap 33c shown in FIG. 10. In this embodiment, angular rotation 55b of lug 22 is about 7 degrees. This rotation is also reflected in the rotation of bottom surface 61 of base 60 of lug 22 about contact edge 19. At this point, the contact between the bearing surfaces of fingers 29a and 29b and lands 31a and 31b are such that further tightening and reduction of the gap between edges 19 and 20 of band 16 will result in the contact of land 31a being on surface 30b of finger 19 and lug element 22 thereby starting to rotate in a clockwise direction around band edge 19 and connection 47 and towards centerline x-x.

Figure 11:
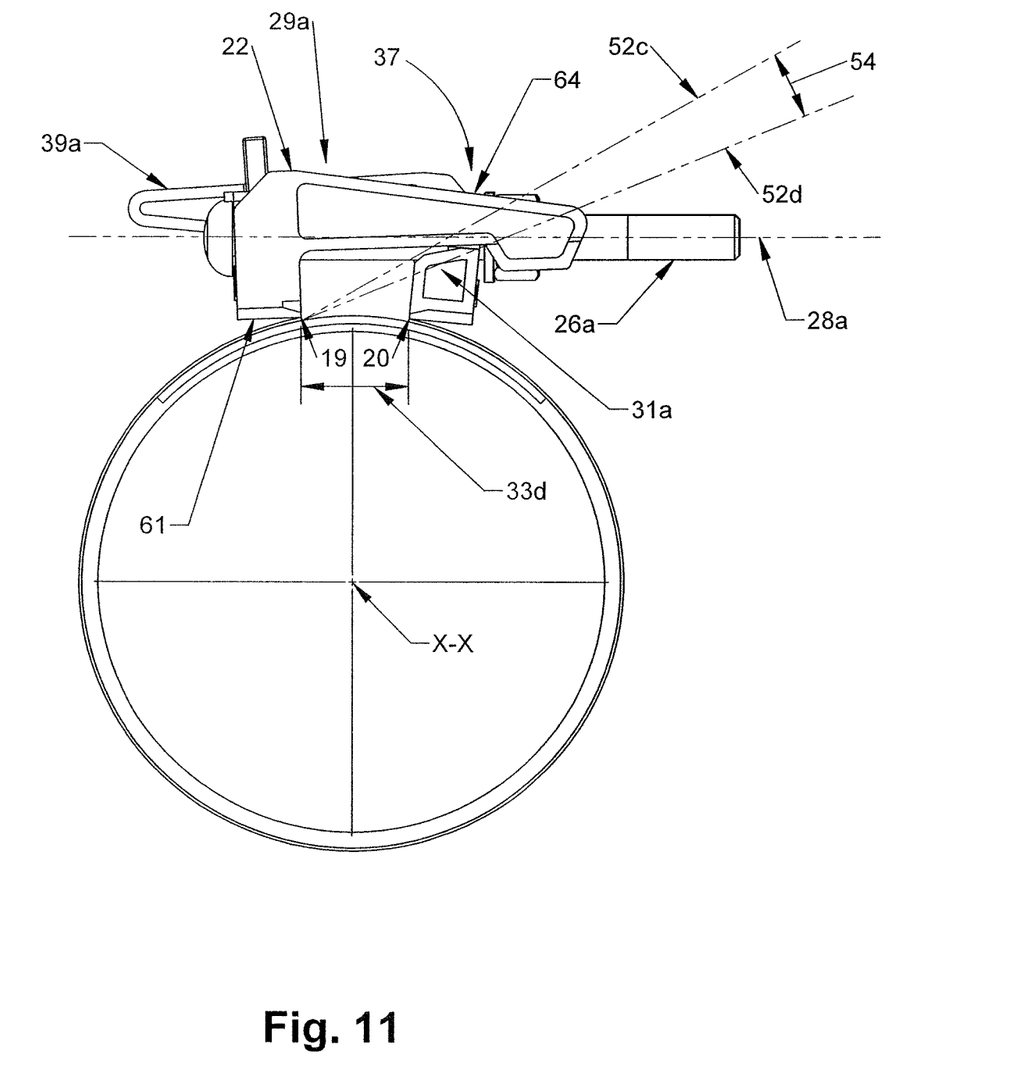
FIG. 11 is a right side view of the repair clamp assembly shown in FIG. 1, with a reduced gap distance as compared to FIG. 10.

FIG. 11 shows assembly 15 after it has been tightened to further reduce the gap between edges 19 and 20. As shown, gap 33c has been reduced to gap 33d. The corner of finger surfaces 30b and 30c has moved past the right edge of surface 32c and lands 31a and 31b have slide up surface 30b of fingers 29a and 29b to contact surface 30a of fingers 29a and 29b. In this embodiment, as a result of the specially contoured opposing profiles of the bearing surfaces of fingers 29a and 29b and lands 31a and 31b, respectively, this movement of lug 22 towards lug 23 results in lug 22 rotating generally about band edge 19 and connection 47 in clockwise direction 37 and towards centerline x-x. As shown, lug 22 has rotated in direction 37 from its rotational position 52c at gap 33c shown in FIG. 10 to new rotational position 52d at gap 33d shown in FIG. 11. In this embodiment, angular rotation 54 of lug 22 is about 7 degrees. This rotation is also reflected in the clockwise rotation of bottom surface 61 of base 60 of lug 22 about contact edge 19.

Figure 12:
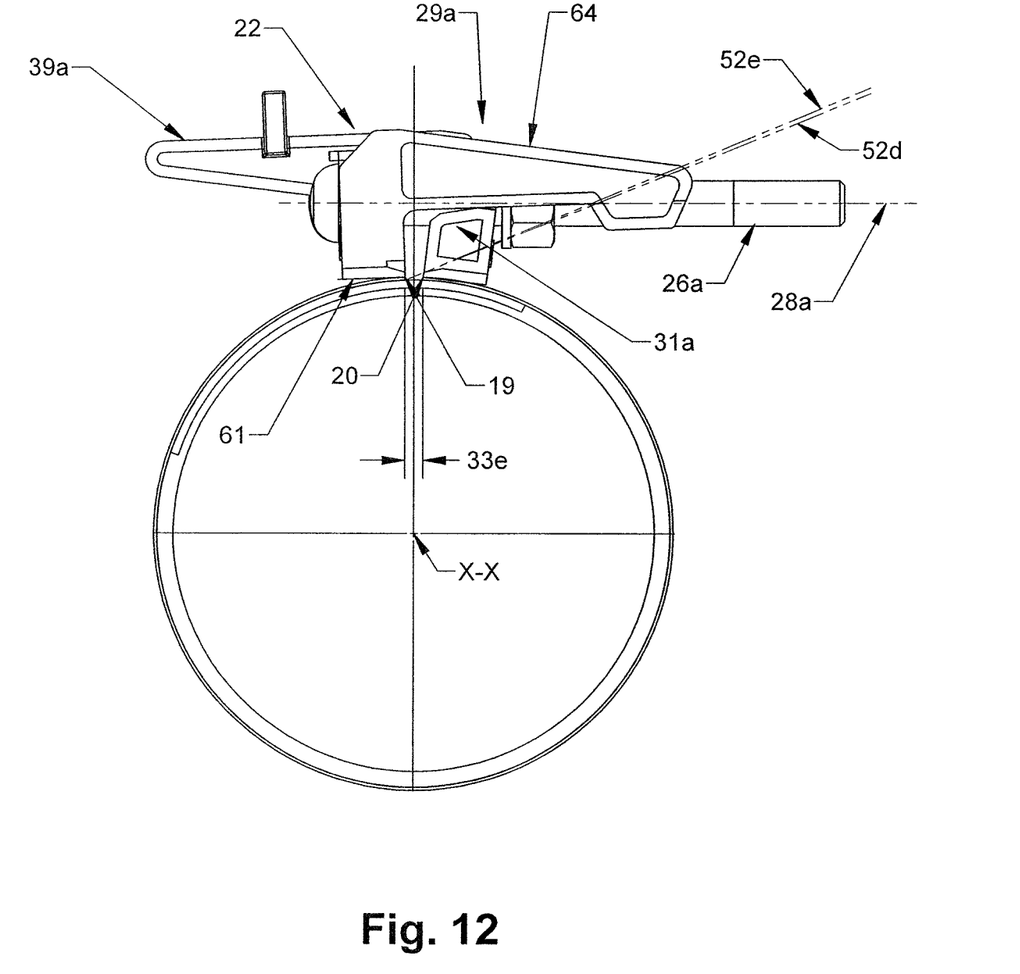
FIG. 12 is a right side view of the repair clamp assembly shown in FIG. 1, with a reduced gap distance as compared to FIG. 11 and in a substantially tightened position.

FIG. 12 shows assembly 15 at a nearly fully tightened position. As shown, the gap between band edge 19 and band edge 20 has been almost entirely reduced and closed. With gap 33e, lug 22 has assumed rotational position 52e. As shown in FIG. 12, in the range of motion closing the gap from 33d, shown in FIG. 11, to 33e, shown in FIG. 12, lug 22 has rotated a small amount at the end of the travel in counterclockwise direction 35 about band edge 19 and connection 47 and away from centerline x-x.

The profiles of the bearing surfaces of fingers 29a and 29b and lands 31a and 31b are such that lug element 22 is rotated as a function of the gap distance between band edges 19 and 20, and such rotation is timed in such a way as to reduce the attack or approach angle of the leading edge 19 of sliding lug 22 at the contact point with spanner 38. This reduced approach angle reduces the likelihood of the leading edge or weld of band 19 and lug 22 creasing or digging into spanner 38, and thereby reduces friction and allows the leading edge 19 of band 16 to slip over spanner 38.

Figure 6:
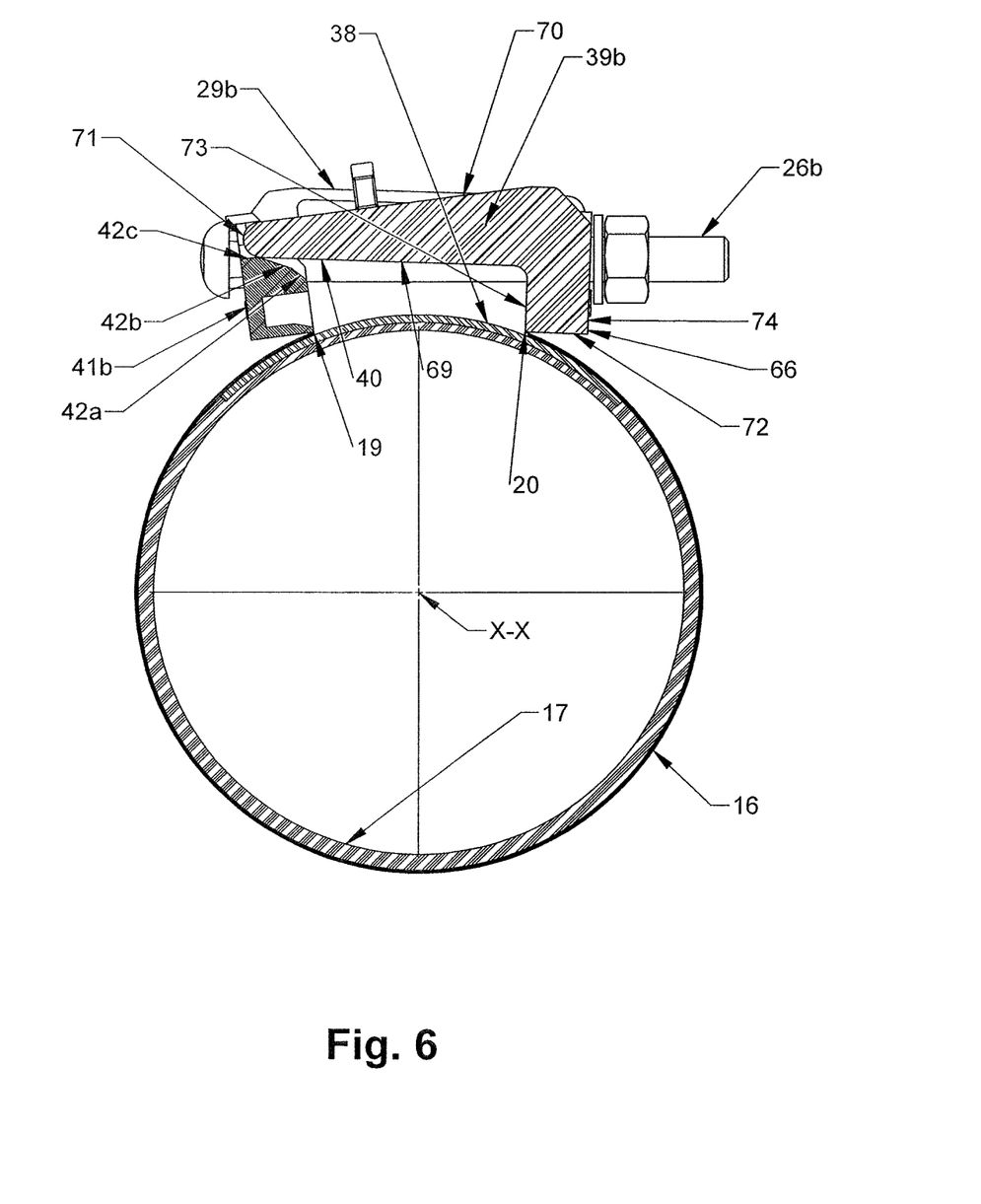
FIG. 6 is a transverse vertical cross-sectional view of the repair clamp assembly shown in FIG. 3, taken generally on line C-C of FIG. 3.

As shown in FIG. 6, fingers 39a and 39b of lug 23 have a more conventional profile, and are generally bounded by a flat transversely extending bearing surface 69 and a top transversely extending surface 70, with surfaces 69 and 70 joined at a rounded end portion 71. As shown, lands 41a and 41b of lug 22 each have a land bearing surface 42a and 42b that is of a similar profile as lands 31a and 31b of lug 23, just orientated to face lands 31a and 31b. The contoured or sloped nature of lands 41a and 41b on lug 22 allow for tip 71 and bottom bearing surface 69 of fingers 39a and 39b of lug 23 to ride up and slide over lands 41a and 41b of lug 22, respectively, as connection assembly 21 is tightened to reduce the gap between band edge 19 and band edge 20 of band 16.

The shape or profile of the bearing surfaces of fingers 29a and 29b and opposed lands 31a and 31b, as well as fingers 39a and 39b and opposed lands 41a and 41b, such as the shape, height, width, length, lateral position, curvature or tilt, may be changed to accommodate differing clamp geometry requirements. These changes may be made in order to optimize the rise, dwell, fall, heights and durations depending on repair clamp diameter range requirements. This applies with respect to both the bearing surfaces of lug fingers 29a and 29b and the bearing surfaces of lands 31a and 31b, as well as the bearing surfaces of lug fingers 39a and 39b and the bearing surfaces of lands 41a and 41b.

Figure 4:
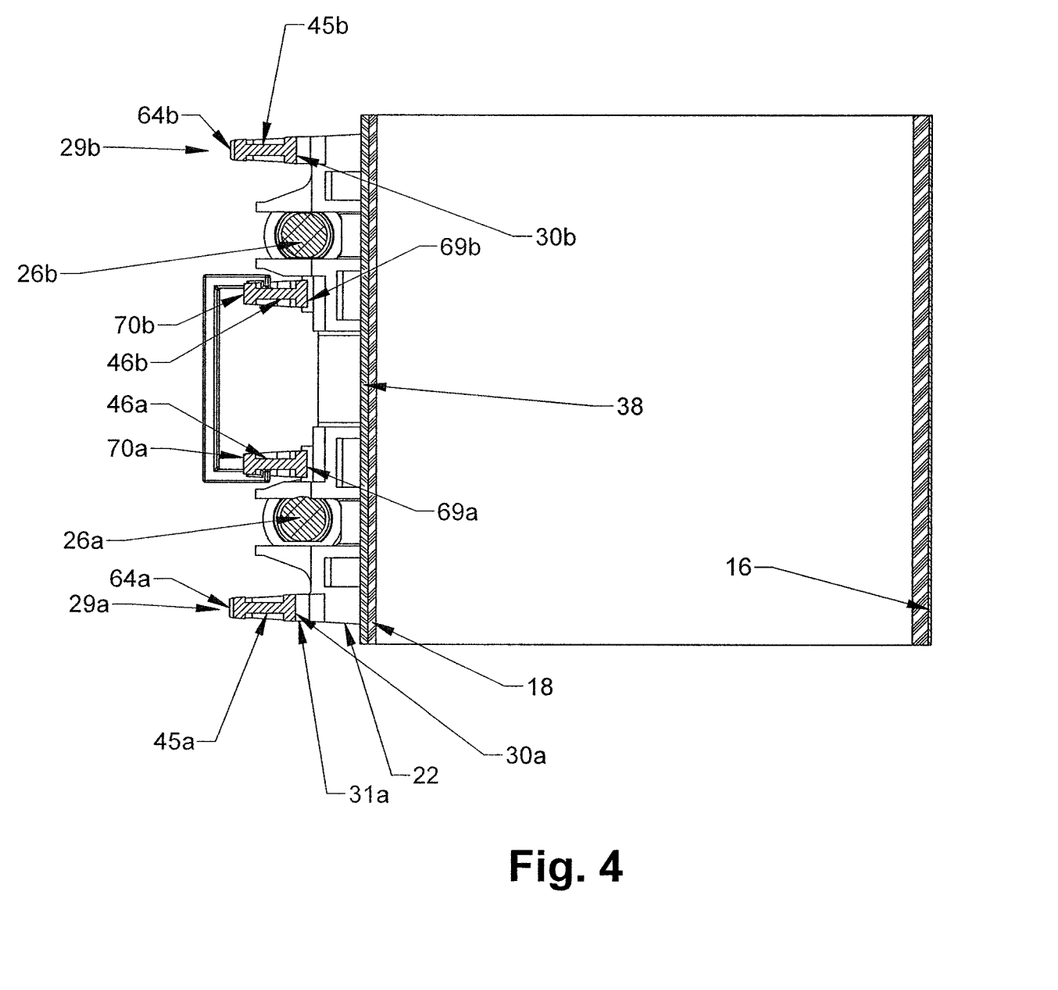
FIG. 4 is a longitudinal vertical cross-sectional view of the repair clamp assembly shown in FIG. 3, taken generally on line A-A of FIG. 3.

As shown in FIGS. 1, 3 and 4, assembly 15 includes grip bar or handle 43, which extends longitudinally between fingers 39a and 39b of lug 23. Handle 43 provides an aid for grasping the completed clamp assembly and orientating it and wrapping it around conduit or pipe 17 for installation. While the handle shown is extending between the fingers of lug 23, the handle could extend longitudinally between other elements of connection assembly 21, such as without limitation the fingers of lug 22.

As shown in FIGS. 1 and 3, a longitudinally extending thumb grip projection 44 is provided in lug 22. Projection 44 extends longitudinally from the side surface 63 of lug 22 and is positioned relative to handle 43 such that a user may wrap his or her fingers around handle 43 and curl his or her thumb around edge 44 and in order to adjust or carry connecting assembly 21. As shown, thumb grip edge 44 is more or less centered longitudinally along lug 22 in the same general longitudinal position as handle 43. This allows for convenient initial closure of connecting assembly 21 by grasping, using the same hand that is grasping handle 43, thumb grip edge 44 and handle 43 after clamp 15 has been wrapped around the target pipe. The thumb and fingers of the same hand may thereby be used to hold the wrapped assembly in position, while freeing up the other had for use in placing bolts 16a and 16b into position and orientating bolt heads 67a and 67b into position in mating slots 24a and 24b, respectively, of lug 22.

As shown in FIG. 4, fingers 29a and 29b as well as fingers 39a and 39b are provided with a general I-beam-shaped cross-section 45 and 46, respectively, with ensuing flange and web portions. This allows for a reduced weight and provides additional cantilever strength to fingers 29 and 39. The interior web portion of the finger cross-section may be optimized in thickness and the flange portion of the finger cross-section may be wider to provide greater surface area to bearing surface 30.

While this embodiment discloses a single panel pipeline repair clamp configuration, the clamp assembly may be used in other configurations or for other purposes. For example, and without limitation, the clamp assembly may be configured for use in a pipeline saddle clamp, a pipeline tapping saddle, a pipeline tapping sleeve and a multi-paneled pipeline repair clamp.

The present invention contemplates that many changes and modifications may be made. Therefore, while forms of the improved clamp assembly has been shown and described, and a number of alternatives discussed, persons skilled in this art will readily appreciate that various additional changes and modifications may be made without departing from the scope of the invention, as defined and differentiated by the following claims.

The invention claimed is:

1. A clamp assembly comprising:
a band configured to clamp on to a fluid conduit oriented about a longitudinally extending axis;
said band comprising a first longitudinally extending edge and a second longitudinally extending edge;
a connecting assembly configured and arranged to tighten said band to said fluid conduit from a non-actuated position to a tightened position;
said connecting assembly comprising a first lug element connected proximate to said first longitudinally extending edge of said band and a second lug element connected proximate to said second longitudinally extending edge of said band;
said first lug element comprising multiple longitudinally spaced bolt receiving openings and said second lug element comprising multiple longitudinally spaced bolt receiving openings;
multiple bolts extending transversely between said first lug element and said second lug element, each of said bolts orientated about a central bolt axis and extending from one of said bolt receiving openings in said first lug element to one of said bolt receiving openings in said second lug element;
said first lug element comprising multiple longitudinally spaced and transversely extending lug fingers, each of said lug fingers comprising an extension portion and a transversely extending spanning finger portion;
said second lug element comprising multiple longitudinally spaced lug finger lands;
each of said lug fingers of said first lug element extending transversely between said first lug element and said second lug element; and
a handle extending longitudinally between at least two of said transversely extending spanning finger portions of said transversely extending lug fingers.

2. A clamp assembly set forth in claim 1, wherein said first lug element comprises a longitudinally extending thumb grip edge.

3. A clamp assembly comprising:
a band configured to clamp on to a fluid conduit oriented about a longitudinally extending axis;
said band comprising a first longitudinally extending edge and a second longitudinally extending edge;
a connecting assembly configured and arranged to tighten said band to said fluid conduit from a non-actuated position to a tightened position;
said connecting assembly comprising a first lug element connected proximate to said first longitudinally extending edge of said band and a second lug element connected proximate to said second longitudinally extending edge of said band;
said first lug element comprising multiple longitudinally spaced bolt receiving openings and said second lug element comprising multiple longitudinally spaced bolt receiving openings;
multiple bolts extending transversely between said first lug element and said second lug element, each of said bolts orientated about a central bolt axis and extending from one of said bolt receiving openings in said first lug element to one of said bolt receiving openings in said second lug element;
said first lug element comprising multiple longitudinally spaced and transversely extending lug fingers;
said second lug element comprising multiple longitudinally spaced lug finger lands;
each of said lug fingers of said first lug element extending transversely between said first lug element and said second lug element; and
at least one of said transversely extending lug fingers having at a transverse position between said first lug element and said second lug element a generally I-beam-shaped longitudinal cross-sectional profile.

4. A clamp assembly set forth in claim 3, wherein each of said transversely extending lug fingers has at a transverse position between said first lug element and said second lug element a generally I-beam-shaped longitudinal cross-sectional profile.

* * * * *